United States Patent

Wewalaarachchi et al.

(10) Patent No.: US 7,587,459 B2
(45) Date of Patent: Sep. 8, 2009

(54) REMOTE APPLICATION PUBLICATION AND COMMUNICATION SYSTEM

(75) Inventors: Bandu Wewalaarachchi, Singapore (SG); Lakshita Sanjeewa Wijerathne, Dehiwala (LK); Viraj Sanjaya Ramanayake, Kandana (LK); Adrian Roshan Liyanage, Negombo (LK)

(73) Assignee: Eutech Cybernetics, Singapore (SG)

( * ) Notice: Subject to any disclaimer, the term of this patent is extended or adjusted under 35 U.S.C. 154(b) by 0 days.

(21) Appl. No.: 11/790,802

(22) Filed: Apr. 27, 2007

(65) Prior Publication Data

US 2007/0203972 A1 Aug. 30, 2007

Related U.S. Application Data

(63) Continuation of application No. 10/122,433, filed on Apr. 16, 2002, now abandoned.

(30) Foreign Application Priority Data

Feb. 5, 2002 (SG) .............................. 200200669-0

(51) Int. Cl.
*G06F 15/16* (2006.01)
(52) U.S. Cl. .................. 709/206; 709/203; 709/202; 709/204; 709/219; 709/223; 709/227; 709/226; 709/229
(58) Field of Classification Search ......... 709/202–206, 709/223, 219
See application file for complete search history.

(56) References Cited

U.S. PATENT DOCUMENTS

| 6,256,676 | B1 | 7/2001 | Taylor et al. |
| 6,516,337 | B1 | 2/2003 | Tripp et al. |
| 6,549,949 | B1 | 4/2003 | Bowman-Amuah |
| 6,640,241 | B1 | 10/2003 | Ozzie et al. |
| 6,738,975 | B1* | 5/2004 | Yee et al. ..................... 719/310 |
| 6,851,115 | B1 | 2/2005 | Cheyer et al. |
| 6,968,500 | B2 | 11/2005 | Mikhailov et al. |
| 2002/0046260 | A1* | 4/2002 | Day, II ....................... 709/219 |
| 2003/0009392 | A1* | 1/2003 | Perkowski ................... 705/26 |
| 2003/0093470 | A1* | 5/2003 | Upton ........................ 709/203 |

FOREIGN PATENT DOCUMENTS

| EP | 0 965 927 | 12/1999 |
| WO | WO 00/14620 | 3/2000 |
| WO | WO 01/55813 | 8/2001 |

\* cited by examiner

*Primary Examiner*—Jude J Jean Gilles
(74) *Attorney, Agent, or Firm*—Morrison & Foerster LLP

(57) ABSTRACT

The invention is a system and method for publishing distributed applications accessible over a distributed network without having publishing computer to accept remote procedure calls from clients, and also allow integration between such distributed applications. In one embodiment, the invention includes a remote application computer having a service agent, translation file, and published software application thereon. The service agent provides the ability to identify the remote application computer and communicate with the distributed network, the translation file provides parameters to the service agent for interpreting the data i/o format of the published application, and the published application monitors and reports on conditions of a building or structure's environmental, security, and occupancy status.

25 Claims, 1 Drawing Sheet

REMOTE APPLICATION PUBLICATION AND COMMUNICATION SYSTEM

CROSS-REFERENCE TO OTHER APPLICATION

Figure 1:
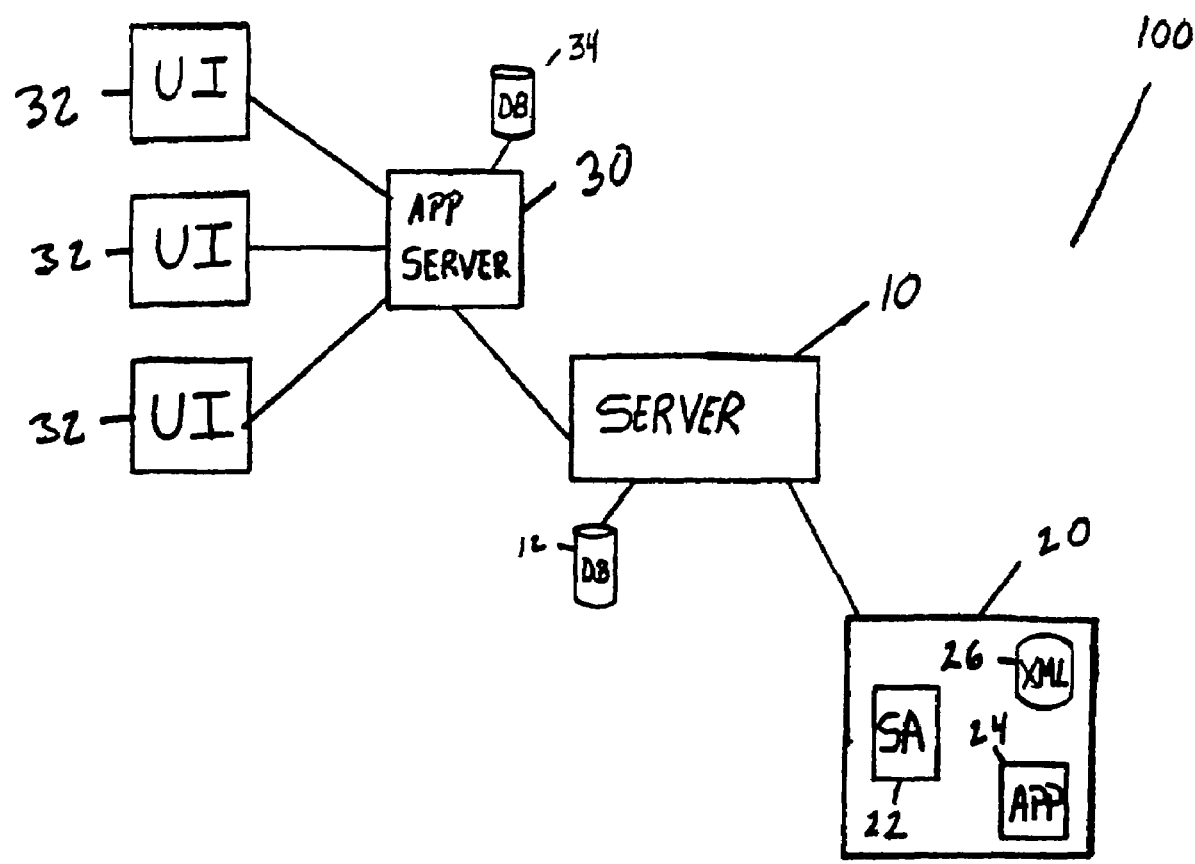

This application is a continuation application of U.S. Ser. No. 10/122,433, filed Apr. 16, 2002, the entirety of which is incorporated herein by reference.

FIELD OF THE INVENTION

The present invention relates to a system and method for publishing applications and integrating them over the Internet. More particularly, the present invention is a system and method for providing access over the Internet to remote applications that are published on remote computers that communicate through a service agent.

BACKGROUND OF THE INVENTION

Presently, there are a variety of systems and methods in use for publishing and communicating with applications residing on computers connected to distributed networks such as the internet. One such method is to publish applications coded in the Javascript programming language on websites. When a user visits the website, the Javascript code is downloaded to their local computer and run within the web browser or java console of the local computer. Such systems require the receiving end computer to be equipped with necessary hardware and software resources to execute the downloaded application. This makes it unusable for accessing via small devices such as PDAs and mobile computing devices.

Another way is using active server pages. This technology executes a script at the server-end and transmits the results in HTML form to the client computer. Although it resolves the resource issue, i.e. any user running a web browser can view the results sent from the server, it makes the data unusable for integration (or further processing) at the receiving-end because it only represents the picture of results—the HTML code.

With above mentioned arts, publishing an application to the Internet requires a static IP address to permit client nodes to locate the publishing computer as a server node. This requires a special connection such as DSL lines or leased lines and also costs extra money to maintain them. Further, it inhibits the deployment of publishing computers over easily accessible dial-up internet service providers that use the point-to-point protocol to assign an IP address dynamically to a client. Another major disadvantage of having a static IP address is that it opens up the publishing computer to access by anyone via Internet, hence it introduces a large risk of being hacked.

One technology that has attempted to address security concerns is Virtual Private Networking (VPN). VPN requires both the client and the server ends to be closed using end-to-end encryption. Further, this requires the client to authenticate the connection using a username and password. As a result, it is unusable for publishing an application or web services to the Internet for access by persons using typical thin-client interfaces, such as web browsers.

Therefore, a method that would allow computers to publish applications or web services over the Internet without exposing it to risks associated with using a static IP address at the publishing computer would be a great advantage from security standpoint.

Moreover, it would be beneficial to have a system that delivers HTML or XML to the client computer yet allows users to bind data received from one Service (application that is exposed to the Internet) to another Service to allow integration between services.

Further, Internet based services generally require users to request information but do not notify users when events occur. Therefore, it would be beneficial to have a system that monitors conditions on behalf of the user and provides notification to the user when a predefined condition occurs, without requiring user intervention.

It would be further beneficial to bind such an event from one service to an action of another service to make an automatic, personalized integration. Additionally, it would be greatly advantageous if the specialized software could communicate with notification systems to provide unsolicited alerts and/or actions to remote devices via cellular phones, pagers, electronic mail systems, etc., when preset conditions have been met.

SUMMARY OF THE INVENTION

The invention is a system and method that permits a software application to be published on a remote computer terminal, with the capability to monitor predefined conditions and generate events, as well as receive such events from another service, and perform an action. According to an embodiment of the invention, the remotely published software application has a corresponding translation file that is read by a service agent. The translation file provides the service agent with the necessary parameters to interpret and process the data received from the remote software application and to also send commands, data, or other instructions to the remote software application.

An advantage of the present invention is that a user can access the remote software application via the Internet to monitor, in real time, data being collected by the remote software application. Further, another software program can monitor the data collected by the remote software application and compare the data with parameters stored in a database to determine if a condition has arisen that requires further action. The further action may include notifying a person, security company, fire company, police station, etc., of the condition that has arisen by either electronic mail, cellular pager, cellular telephone, any similar communications device, or combinations thereof. More importantly, the system could notify another application that is published using the same invention to perform a further action, initiate notification itself, or initiate some other action. Hence the present invention provides personalized integration over the Internet, by allowing a user or system administrator the ability to tie groups of resources together, software applications and services in particular, that will interact with one another through sets of rules that dictate what each software application should do in response to certain criteria, e.g., when a notification parameter or other parameter has been met.

For example, if one service is a remotely published application that monitors environmental conditions in a large office building. A user connecting to the Internet with a thin-client such as a web browser can set up a second service that includes notification conditions, e.g., events that must occur to trigger when a notification message will be sent to the user. One condition may be when the temperature on any floor of the building reaches a preset level. The remote application publishes the temperature over the Internet to a service agent allowing the user's second service to compare the data to the user's notification conditions. The user's second service may be the service agent itself, a second service agent, or an application or service running on a central server that received published data from the service agent. If the temperature on a floor of the building reaches the user's preset level, a notification can be sent to the user via email, a web browser, cellular phone, page, etc. Alternatively, some other action could be initiated when the user's notification condition is met, e.g., an alarm is sounded, the HVAC system of a monitored building is activated, etc. Further the user may wish to publish numerous remote applications, each carrying out a different function, as,a set of web services.

This system and method is particularly advantageous for remote building maintenance and security, travel and reservations systems, and other businesses where it is desirable to access real-time data from a variety of locations and provide notice to selected parties upon the occurrence of pre-defined events or perform further actions.

The system for publishing applications for access over the Internet of the present invention includes a published application stored on a computer readable medium, a service agent stored on the same or another computer readable medium in electronic communication with the published application, and a translation file accessible by the service agent and containing parameters for identifying the i/o format of the published application to permit the service agent to communicate with the published application. In one embodiment of the invention, the translation file is an XML (extended markup language) format data file.

The present invention may further comprise a remote application computer comprising a central processing unit and at least one storage device comprising a computer readable medium. The service agent, the published application, and the translation file are stored on computer readable media on the storage device or on separate storage devices accessible to the remote application computer.

The invention can further comprise a central server in electronic communication with said remote application computer. The function of the central server is to establish electronic communication with at least one, and preferably numerous, remote application computers over the internet or a wide area network. In such case, the remote application computer connects to the central server as a client node on the Internet, unlike in the prior art where it is required to publish as a server node with a static IP address. According to this feature of the invention, the remote application computer does not maintain an open port to receive connections. Instead, it only initiates communications with the central server. In the instances that the remote application computer is not in communication with the central server, the remote application computer is not open to any communication. In the instances where the remote application computer is in communication with the central server, it's communication port does not listen to further connection requests or remote procedure calls and thus is not open to unauthorized access.

This feature of the invention thus eliminates the risk of the remote computer being exposed to Internet as a server node and accessible for hacking, thereby introducing a security layer to the published application An application server is also included and is in electronic communication with at least one central server. The application server includes a parameter database that comprises data that can comprise, but is not limited to, user logon information, permission files, and network addresses of at least one central server. The application server permits users connected to the application server via user terminals that are connected to the internet, but not necessarily directly to the application server, to view data collected or generated by the published applications, perform functions carried out by the remote applications, and to receive notifications, alerts, or other messages from the central server when specific conditions arise that are identified in a parameter file stored by the central server.

BRIEF DESCRIPTION OF THE DRAWING FIGURE

FIG. 1 is a schematic representation of a computing network including a published application according to the present invention.

DETAILED DESCRIPTION OF THE INVENTION

The present invention is a system and method that permits the publication of applications on local computers that are connected to distributed networks in a manner that allows remote users and computers on the network to communicate with the published application. Such a system includes, for example, monitoring software that is published on a computer for the purpose of monitoring and tracking the security, environment, or other condition existing within an office building, hotel, or other facility. A user located at a remote location, such as at the offices of a security service, fire station, etc., may wish to have real-time access to the data collected and generated by the published application and, optionally, for proper entities to be notified when certain conditions arise.

With reference to FIG. , in an embodiment of the present invention, a central server 10 is in electronic communication with a remote application computer 20. The communication can be achieved via any known communications protocol and over any known type of network transport, i.e., fixed phone lines, cellular network, ethernet networks, etc. Those skilled in the art will recognize that there are many protocols used on such networks including TCP/IP, HTTP, ethernet, X.34, etc. It is permissible to mix network types and protocols to permit communication between various networks when, for example, the remote application computer 20 communicates with the central server 10 via an ethernet connection and the central server communicates with a general application server 30 that, in turn, communicates with remote clients 32 via TCP/IP and/or HTTP protocol over the internet. This permits the remote clients 32 to run any type of operating system convenient for the user and to employ a wide variety of user interfaces. Most commonly, however, the remote clients 32 will use a web browser as the user interface and communicate with the general application server 30 via the internet using a combination of the TCP/IP and HTTP protocols. Alternatively, the remote client 32 can be a computer that receives data from the remote application computer 20 for the purpose of routine monitoring or to ensure that conditions, such as temperature, HVAC operation, or other environmental conditions are maintained within specified parameters at a particular location.

The remote application computer 20 includes a service agent 22, a published application 24, and a translation file 26. The service agent 22 is an application that permits the remote application computer to be identified by and to communicate with the central server 30. By employing a service agent 22 for this purpose, the remote application computer 20 does not require a static IP address to be located and identified by the central server 30 for communication. Static IP addressing may, however, be used for the remote application computer 20, if desired.

To avoid unauthorized access to the remote application computer 20, this computer is connected to the network as a client node. A client node, in this instance, is capable of electronic communication with the central server 10, but does not maintain an open port to receive connections. The central server 10 maintains an open port for connections and, thereby, permits access to the published application 24 on the remote application computer 20 by authorized network users.

In one embodiment of the invention, the remote application computer 20 includes a dynamically assigned IP address. Since dynamic IP addresses can change between sessions when the remote application computer 20 is connected to the network, and because the remote application computer 20 connects to the network as a client node, it is extremely difficult for unauthorized network users to locate, access, or communicate with the remote application computer 20. Prior art methods and systems required a publishing computer to establish itself as a server node on the network with a static IP address.

Thus, according to the present invention, when acting as a client node, the remote application computer 20 transmits its IP address to the central server 30 when it connects to the network, allowing the central server 30 to establish a communication link with the data published by the service agent 22. Moreover, by establishing the remote application computer 20 as a client node, unauthorized access to the published data and service agent 22 are inhibited, since a "hacker" would first have to know the location of the remote application computer 20 on the internet, i.e., the IP address, before attempting to hack into the computer and access data stored thereon.

The translation file 26 can be a text file, XML (extended markup language) file, or similar file known in the art that contains a set of parameters that permits the service agent 22 to communicate with the published application 24. To allow the use of a published application 24 that is unrestricted in the form of its data output, the translation file 26 is opened and read by the service agent. The information stored in the translation file 26 includes the format of the data output from the published application 24, the type of data output from the published application 24 and any additional information that might be required by the service agent 22 to communicate with the published application 24. Those skilled in the art will readily recognize that the translation file 26 contains the basic protocol (also referred to in the art as i/o format) necessary for communication between the service agent 22 and the published application 24. By configuring the remote application computer 20 in this manner, it eliminates the need for the published application 24 to be programmed to input and output information in a particular format to communicate with the service agent 24.

Although only a single remote application computer 20 is shown in the drawing figure, it is preferred that the central server 10 be in electronic communication with a plurality of remote application computers 20. It is possible, for instance to set up a system according to the present invention wherein multiple central servers operate worldwide. Individual servers 10 can be employed, for example to cover North America, Asia, Europe, and the Pacific Rim, with each central server 10 in electronic communication with dozens, hundreds, or even thousands of remote application computers, depending on the operating capacity of the central server (i.e., storage space, processing power, network bandwidth, etc.) Creating the system of the present invention in this manner would permit a company to operate a worldwide building environmental monitoring network, hotel reservation system, or other system where it is desirable to receive and coordinate data from a large variety of locations. Since each location has the ability to publish a remote software application 24 that can communicate with the central server 10 via the translation file 26, the present system enables each location to publish an application that is tailored to the specific needs at that location. Such specific needs may include local software that is in a particular language, software that monitors specific environmental conditions for a large building, software that monitors security status at a financial institution or office building, a conference room reservation system at a convention center, etc. It is also possible for multiple service agents to communicate with one another and for a user's parameter file to include instructions to notify a particular service agent when an event occurs.

Data that is input to or monitored by the remote application computer 20 is transmitted to the central server 10 via a direct link, distributed network, wireless network or other electronic means. The central server 10 may store the data received from the remote application computer 20 or, in one embodiment, compare the data against parameter files stored in a database 12 to determine if some condition has been met that requires the central server 10 to initiate further action such as to send an alert or other message. For example, when the remote application computer 20 is monitoring the environmental conditions of an office building and senses that the temperature is rising above the value stored in the parameter file in database 12, the server may initiate an electronic mail message, cellular phone call, cellular pager message, etc., to the building superintendent or other party responsible for the office building. Since the parameter files in the central server's 10 database 12 can include a wide variety of "if . . . then . . . else" type instructions for the central server 10 to follow upon receipt of data from the remote application computer 20, it is possible for the central server 10 to perform many functions.

In the previous example, a party is notified of the occurrence of an event that is monitored by the remote application computer 20 and reported (by the electronic transmission of data) to the central server 10 because a comparison of data received by the central server to notification conditions included in the parameter file indicated that a notification condition had arisen. Thereafter, the notified party may desire to access and review the data collected by the remote application computer 20 by logging onto the network via a user terminal 32 to obtain additional information or access the building's environmental control systems. In the absence of notification, the present system allows a remote user to access current monitoring conditions and any data previously collected by the remote application computer 20, if such data is chosen to be stored at either the remote application computer 20 or the central server 10.

The user terminal 32 may be any computer in electronic communication with the central server 10 via an application server 30. Typically, the communication between the user terminal 32 and the application server 30 will be via the internet. Private networks, however, such as wide area networks and local area networks can also be structured according to the present invention. Further, the user terminal 32 may be a wireless device such as a handheld computer, cellular telephone, or other device that includes the capability of communicating with other computers across a network.

To access the data, information, or other functions that can be performed by the remote application computer 20 (such as, but not limited to, controlling environmental systems, making reservations, controlling security systems, and performing building maintenance functions), the user employs the user terminal 32 and establishes a connection with the application server 30. The application server includes a logon database 34 that includes identification data for each user recognized by the system. Such information typically includes a logon ID, password, and a set of "permissions" for each user. The permissions for each user will include the remote application computer 20 that a user is permitted to access and the functions they are permitted to execute on that computer. The function may be accessing data, managing data, performing system maintenance, and/or accessing control systems (particularly when the remote application computer 20 has the capability of interfacing with the environmental control system, security system, or other building maintenance or operation system). Further, it is possible to integrate the application server 30 and central server 10 onto the same workstation computer, structure the system to operate the servers on separate computers, or use combinations thereof when multiple central servers 10 or application servers 30 are employed. One function of the application server 30 will be to keep track of the central server 10 to which the remote application computer 20 is in electronic communication with, and to route data and instructions between the user terminal 32, appropriate central server 10, and any remote application computers 20 which the user is permitted to access. This provides the user with the ability to monitor and carry out functions remotely for any location where a remote application computer 20 is installed.

The central server 10 maintains routing information for any remote application computers 20 connected thereto, and it is responsible for routing data from the remote application computer to the application server 30 which, in turn, routes communications to the user terminal 32. To enable the transmission of data, information, and instructions between the published application 24 and user terminal 32, the service agent 22 running on the remote application computer 20 conducts all communications between the published application 24 and central server 10.

Periodically, or solely at start-up, the service agent 22 will contact the central server 10 and supply the central server with an indication that the remote application computer 20 exists on the network at a particular location. In the instance where the remote application computer 20 is connected to the central server 10 via the internet, the service agent 22 will transmit the IP (internet protocol) address of the remote application computer 20 to the central server 10. This permits the central server 10 to route communications to the remote application computer 20. The central server 10 may communicate periodically with the service agent 22 to verify that the remote application computer 20 or published application 24 operating thereon remains accessible and online. Further, there may exist a parameter in the database 12 to notify a particular user when a specific remote application computer 22 or published application 24 goes online or offline. Communication between the service agent 22 and the published application 24 is facilitated by the translation file 26, but it is not required for there to be any additional intermediary processing or computing between the service agent 22 and the published application 24.

The various applications referred to herein may also reside and run on computers as services. The applications described herein may run as typical applications or as services and services and applications may both be used while carrying out the present invention. For example, if one service is a remotely published application that monitors environmental conditions in a large office building. A user connecting to the Internet with a thin-client such as a web browser can set up a second service or application that includes notification conditions, e.g., events that must occur to trigger when a notification message will be sent to the user. One condition may be when the temperature on any floor of the building reaches a preset level. The remote application publishes the temperature over the Internet to a service agent allowing the user's second service to compare the data to the user's notification conditions. The user's second service may be the service agent itself, a second service agent, or an application or service running on a central server that received published data from the service agent. If the temperature on a floor of the building reaches the user's preset level, a notification can be sent to the user via email, a web browser, cellular phone, page, etc. Alternatively, some other action could be initiated when the user's notification condition is met, e.g., an alarm is sounded, the HVAC system of a monitored building is activated, etc. Further the user may wish to publish numerous remote applications, each carrying out a different function, as a set of web services.

What is claimed is:

1. A system for publishing applications for access over the Internet, comprising:

a published application stored on a computer readable medium on a publishing computer;

a server in communication with the Internet;

a service agent in electronic communication with said published application and selectively in communication with the server; and a translation file accessible by said service agent containing parameters for identifying the i/o format of said published application, wherein said service agent selectively communicates with the server as a client node, said service agent interpreting data received from said published application through the use of said translation file, wherein, while said service agent is in communication with the server, said publishing computer does not listen to communication that is not from the server, and wherein, while said service agent is out of communication with the server, said publishing computer is not open to any communication.

2. The system of claim 1 wherein said translation file is an XML format data file.

3. The system of claim 1 wherein a static IP address is assigned to said publishing computer.

4. The system of claim 1 wherein a dynamic IP address is assigned to said publishing computer.

5. The system of claim 1 wherein said translation file is a script for instructing said service agent to publish specific data over the Internet.

6. The system of claim 5 further comprising a service agent for storing at least one notification parameter comprising at least one notification.

7. The system of claim 6 wherein said service agent receives data from said published application.

8. The system of claim 7 further comprising a notification transmitted from said service agent to at least one user terminal in response to said service agent having monitored data corresponding to said notification condition.

9. A system for publishing a remote application, comprising:

a publishing computer having a central processing unit and at least one storage device;

a published application stored on said at least one storage device in electronic communication with said publishing computer;

a server in communication with the Internet;

a translation file stored on said at least one storage device comprising i/o format information for the published application;

a service agent stored in electronic communication with said published application and selectively in communication with the server, wherein said service agent interprets data received from said published application through the use of said translation file, wherein said translation file further comprises at least one instruction to publish data; and a user terminal having a thin-client interface for communicating with said service agent via the Internet, wherein, while said service agent is in communication with the server, said publishing computer does not listen to communication that is not from the server, and wherein, while said service agent is out of communication with the server, said publishing computer is not open to any communication.

10. A method for publishing an application over the Internet, comprising:

providing a publishing computer including a published software application, a translation file, and a service agent;

selectively establishing a connection between said publishing computer and a central server, said publishing computer having a dynamically assigned IP address;

reading an instruction to publish data from said translation file by said service agent, wherein said service agent interprets said data received from said published software application through the use of said translation file; and publishing said data from said service agent to said central server, wherein, while the connection is established, said publishing computer does not listen to communication that is not from said central server, and wherein, while the connection is not established, said publishing computer is not open to any communication.

11. The method of claim 10 further receiving said data at a service agent, said service agent including a notification parameter file comprising at least one notification parameter.

12. The method of claim 11 further comprising comparing said data to said notification parameter.

13. The method of claim 12 further comprising transmitting a notification message from said service agent to a user terminal when said notification parameter corresponds to said data.

14. The method of claim 13 further comprising receiving said notification message at said user terminal, said user terminal having a thin-client interface comprising a web browser.

15. The system of claim 9, wherein said publishing computer is assigned an IP address that is dynamic.

16. The method of claim 11 wherein said notification parameter comprises actions, events, or both.

17. The method of claim 16 further comprising binding said data published by said service agent to an action or an event and then transmitting a notification message to a user terminal specifying the action or the event that has been bound to said data.

18. The method of claim 11 further comprising a second service agent for transmitting instructions to said service agent and executing said instructions by said service agent.

19. The method of claim 10 further comprising denying access to at least one unauthorized user terminal to said data published onto the Internet by said service agent.

20. The system of claim 1 wherein said published application comprises a web service.

21. The system in claim 1 wherein said system is used as a firewall to publish an application to Internet without a static IP address.

22. The system of claim 1 wherein said service agent communicates, in the identified i/o format, with said published application using said translation file.

23. The system of claim 9 wherein said service agent communicates, in the i/o format, with said published application using said translation file.

24. The system of claim 1 wherein said translation file identifies the i/o format without translating the i/o format into another format.

25. The method of claim 10 further comprising:

identifying an i/o format of said published software application using said translation file; and communicating, in the identified i/o format, by said service agent with said published software application.

* * * * *